United States Patent
Chang et al.

(10) Patent No.: US 8,420,970 B2
(45) Date of Patent: Apr. 16, 2013

(54) TOUCH PANEL

(75) Inventors: Chih-Chao Chang, Taipei (TW); Chao-Yong Hsu, Changhua County (TW); Shih-Hung Huang, Taoyuan County (TW); Hung-Hsiang Chen, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 192 days.

(21) Appl. No.: 13/088,739

(22) Filed: Apr. 18, 2011

(65) Prior Publication Data

US 2012/0186966 A1    Jul. 26, 2012

(30) Foreign Application Priority Data

Jan. 25, 2011  (TW) .............................. 100102618 A

(51) Int. Cl.
  *H03K 17/975* (2006.01)
(52) U.S. Cl.
  USPC ....................................................... 200/600
(58) Field of Classification Search .................. 200/600, 200/46, 5 R, 5 A, 292, 511, 512
  See application file for complete search history.

(56) References Cited

U.S. PATENT DOCUMENTS

| 7,633,564 | B2  |     | 12/2009 | Hong et al. |
| 7,864,503 | B2  | *   | 1/2011  | Chang ............................ 361/288 |
| 2008/0142352 | A1 | * | 6/2008 | Wright ........................... 200/600 |
| 2012/0080302 | A1 | * | 4/2012 | Kim et al. ..................... 200/600 |

FOREIGN PATENT DOCUMENTS

TW    M385751    8/2010

* cited by examiner

*Primary Examiner* — Edwin A. Leon
(74) *Attorney, Agent, or Firm* — WPAT PC; Justin King

(57) ABSTRACT

A touch panel includes a substrate, plural first bridges, an insulating layer, plural conductive columns, plural second bridges, plural first sensing pads, plural second sensing pads, a reticulated electrode, and plural discharge electrodes. The insulating layer disposed on the substrate covers the first bridges and the substrate. The conductive columns are connected between the first sensing pads and the first bridges. The second bridges, the first sensing pads, the second sensing pads, the reticulated electrode, and the discharge electrodes are disposed on the insulating layer. Each of the second bridges is connected between two adjacent second sensing pads. The first sensing pads and the second sensing pads are located in openings of the reticulated electrode respectively and electrically insulated from the reticulated electrode. Each of the discharge electrodes connected to the reticulated electrode is located between two adjacent first sensing pads and between two adjacent second sensing pads.

10 Claims, 3 Drawing Sheets

TOUCH PANEL

CROSS-REFERENCE TO RELATED APPLICATION

This application claims the benefit of Taiwan Patent Application No. 100102618, filed on Jan. 25, 2011, which is hereby incorporated by reference for all purposes as if fully set forth herein.

BACKGROUND OF THE INVENTION

1. Field of Invention

The present invention relates to a touch panel, and more particularly to a touch panel enhancing an ability of protection from electrostatic discharge.

2. Related Art

A touch panel is a common input device, which can be used for controlling an electronic apparatus such as a mobile phone, a personal digital assistant (PDA), a global positioning system (GPS) navigator, and a computer. Generally, the touch panel has a touch surface and includes a plurality of sensing pads and a plurality of bridges connected to the sensing pads.

When a user touches the touch surface with a finger or a stylus, and the finger or the stylus moves on the touch surface, the sensing pads can detect positions and movement of the finger or the stylus on the touch surface. According to the positions and the movement of the finger or the stylus on the touch surface, the user can operate an electronic apparatus through the touch panel, for example, move a cursor displayed on a screen of the electronic apparatus.

However, when the user operates the electronic apparatus by using the touch panel, electrostatic discharge (ESD) occurs easily, so a bridge is easily damaged by static electricity, thereby resulting in broken circuit between two sensing pads originally electrically connected to each other. It makes the touch panel on operation malfunction or misidentify, and even the touch panel has to be discarded.

SUMMARY OF THE INVENTION

The present invention provides a touch panel for reducing a chance that a bridge is damaged by static electricity.

The present invention provide a touch panel including a substrate, a plurality of first bridges, an insulating layer, a plurality of conductive columns, a plurality of second bridges, a plurality of first sensing pads, a plurality of second sensing pads, a reticulated electrode, and a plurality of discharge electrodes. The first bridges are disposed on the substrate. The insulating layer is disposed on the substrate and covers the first bridges. The conductive columns are disposed in the insulating layer. Each of the first bridges is connected to two adjacent conductive columns. The second bridges are disposed on the insulating layer and crossed the first bridges respectively. The first sensing pads are disposed on the insulating layer and connected to the conductive columns. Each of the first bridges is located between two adjacent first sensing pads. The second sensing pads are disposed on the insulating layer. Each of the second bridges is connected between two adjacent second sensing pads. The reticulated electrode is disposed on the insulating layer and has a plurality of openings arranged in an array. The first sensing pads and the second sensing pads are located in the openings respectively. The first sensing pads and the second sensing pads are electrically insulated from the reticulated electrode. The discharge electrodes are disposed on the insulating layer and connected to the reticulated electrode. Each of the discharge electrodes is located between two adjacent first sensing pads and between two adjacent second sensing pads.

Based on the above description, through the reticulated electrode and the discharge electrodes, the present invention can generate a plurality of discharge paths for discharging the electric charges within the first sensing pads and the second sensing pads to the reticulated electrode or the discharge electrodes. Therefore, a chance that the first sensing pads, the second sensing pads, the first bridges, and the second bridges are damaged by static electricity can be reduced to enhance an ability of protecting the touch panel from electrostatic discharge, thereby improving a product reliability.

In order to make the aforementioned features and advantages of the present invention more comprehensible, preferred embodiments are illustrated in detail below with reference to the accompanying drawings.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1A:
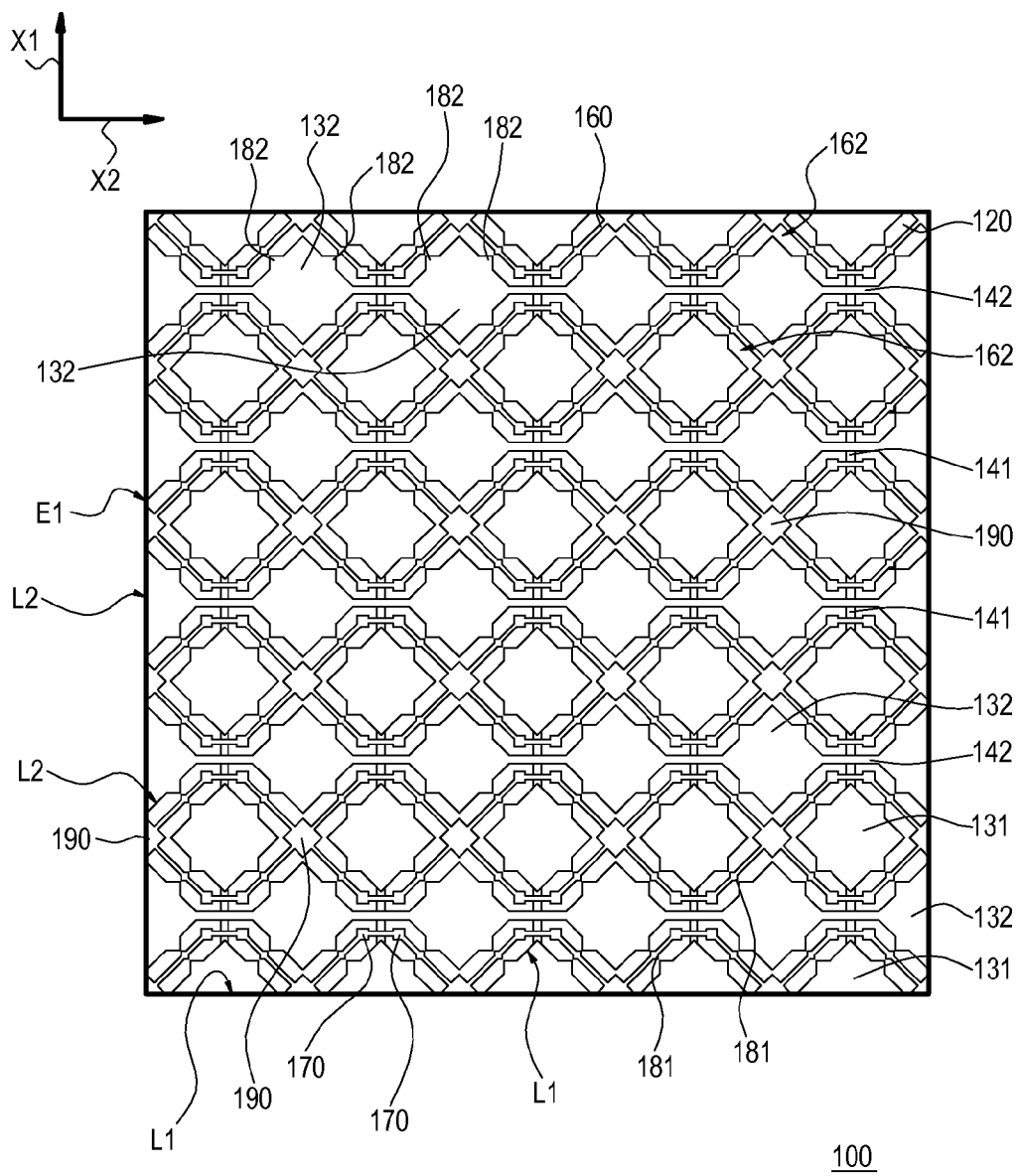
FIG. 1A is a schematic top view of a touch panel according to an embodiment of the present invention.
Figure 1B:
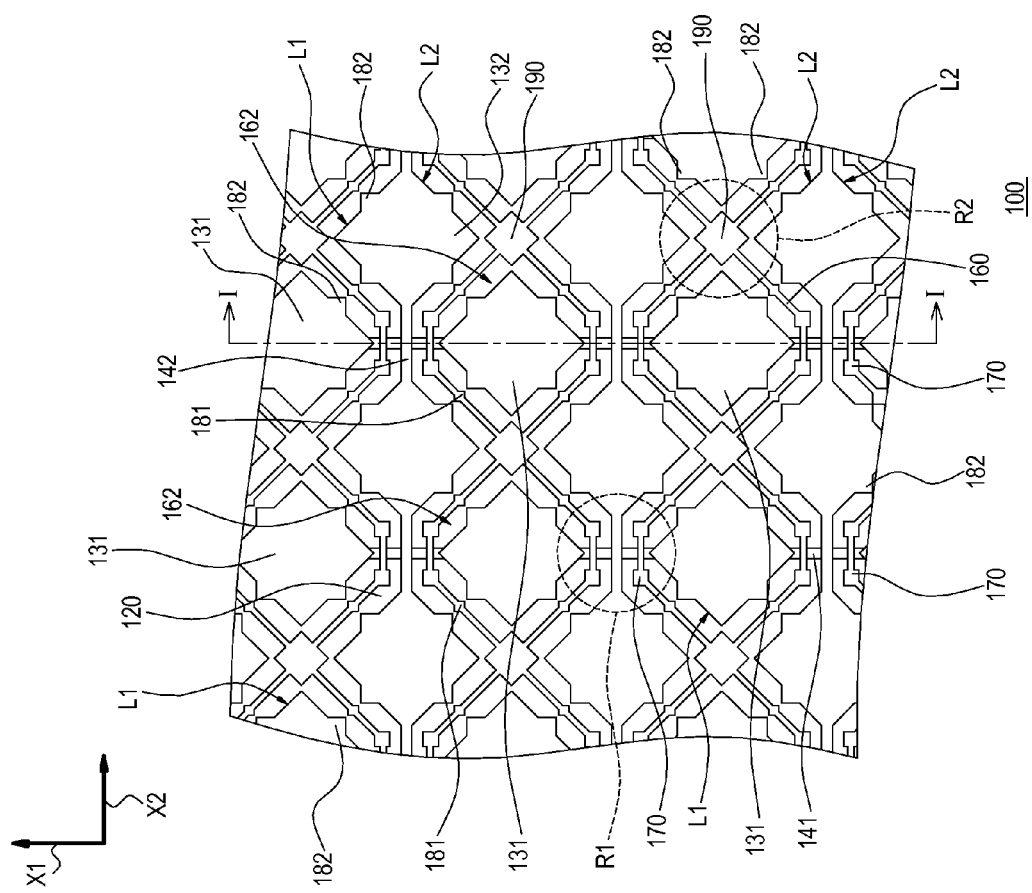
FIG. 1B is a schematic partial enlarged view of the touch panel in FIG. 1A.
Figure 2:
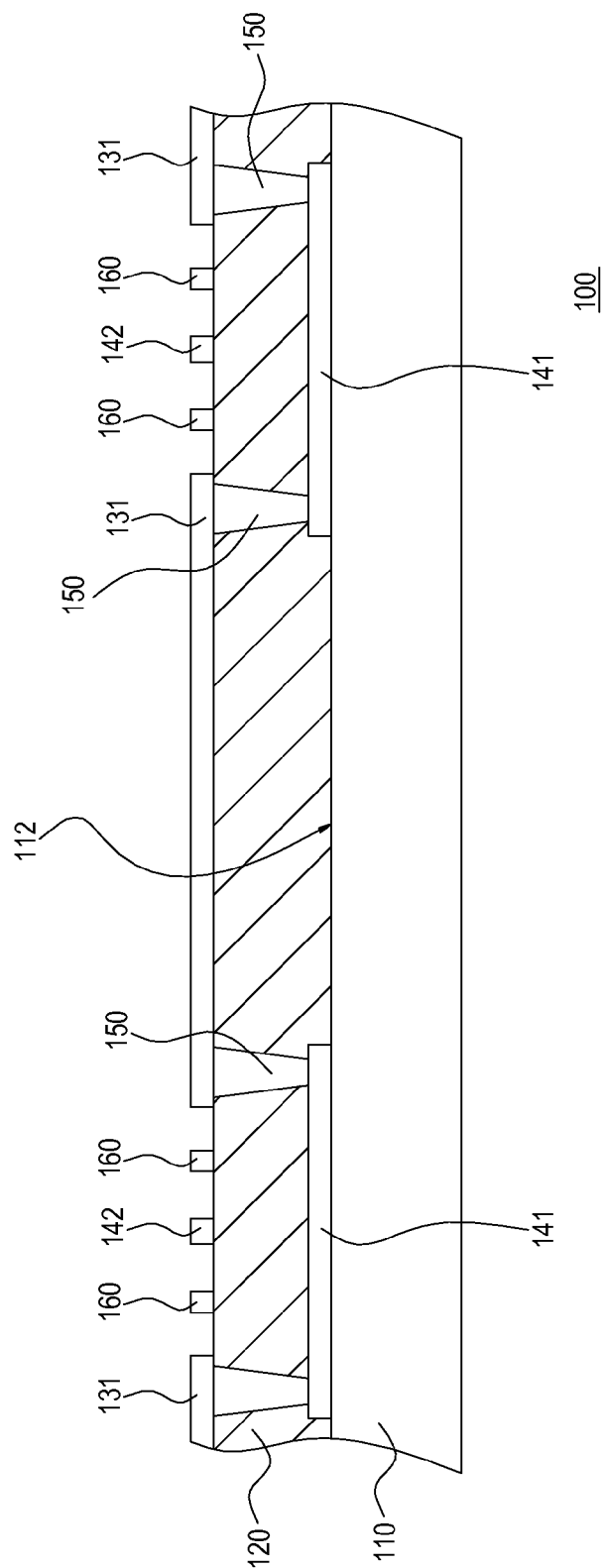
FIG. 2 is a schematic cross-sectional view taken along a line I-I in FIG. 1B.

FIG. 1A is a schematic top view of a touch panel according to an embodiment of the present invention, FIG. 1B is a schematic partial enlarged view of the touch panel in FIG. 1A, and FIG. 2 is a schematic cross-sectional view taken along a line I-I in FIG. 1B. Referring to FIG. 1A, FIG. 1B, and FIG. 2, a touch panel 100 includes a substrate 110, an insulating layer 120, a plurality of first sensing pads 131, a plurality of second sensing pads 132, a plurality of first bridges 141, a plurality of second bridges 142, a plurality of conductive columns 150, a reticulated electrode 160, and a plurality of discharge electrodes 170.

The insulating layer 120 and the first bridges 141 are disposed on the substrate 110, and the first sensing pads 131, the second sensing pads 132, the second bridges 142, the reticulated electrode 160, and the discharge electrodes 170 are disposed on the insulating layer 120. The insulating layer 120 covers the first bridges 141. Specifically, the substrate 110 has a plane 112, and the insulating layer 120 and the first bridges 141 are disposed on the plane 112. The insulating layer 120 completely covers the plane 112 and the first bridges 141.

The conductive columns 150 are disposed in the insulating layer 120 and connected to the first sensing pads 131 and the first bridges 141. Each of the first bridges 141 is connected to two adjacent conductive columns 150 and located between two adjacent first sensing pads 131. Through the conductive columns 150 and the first bridges 141, two adjacent first sensing pads 131 are electrically connected to each other.

The second bridges 142 are all disposed on the insulating layer 120, so the insulating layer 120 is located between the first bridges 141 and the second bridges 142. As seen from FIG. 1A and FIG. 1B, the second bridges 142 crosses the first bridges 141 respectively, so the second bridges 142 and the first bridges 141 are partially overlapped. Furthermore, each of the second bridges 142 is connected between two adjacent second sensing pads 132, and through the second bridges 142, two adjacent second sensing pads 132 can be electrically connected to each other.

When a user operates the touch panel 100 with a finger or a stylus, the finger or the stylus approaches certain first sensing pads 131 and certain second sensing pads 132, thereby changing capacitance values of both the first sensing pads 131 and the second sensing pads 132. According to the changes of the capacitance values, the touch panel 100 is able to know positions and movement of the finger or the stylus, so the user can operate an electronic apparatus such as a mobile phone, a personal digital assistant, a GPS navigator or a computer through the touch panel 100. For example, the user can move a cursor displayed on a screen of an electronic apparatus through the touch panel 100.

It is worth to note that two adjacent first sensing pads 131 are electrically connected to each other, and two adjacent second sensing pads 132 are electrically connected to each other, but the first sensing pads 131 and the second sensing pads 132 are not directly electrically connected to each other. Therefore, sensing signals output by the first sensing pads 131 are not received by the second sensing pads 132 basically, and sensing signals output by the second sensing pads 132 are not received by the first sensing pads 131 either.

The first bridges 141 extend in a first direction X1, and the second bridges 142 extend in a second direction X2. The first direction X1 is vertical to the second direction X2, so a stretching direction of the first bridges 141 is basically vertical to a stretching direction of the second bridges 142. Taking FIG. 1A and FIG. 1B as an example, the first direction X1 is a vertical direction, and the second direction X2 is a horizontal direction, so the first bridges 141 are basically vertical to the horizontal line, and the second bridges 142 are basically parallel to the horizontal line.

Shapes of both the first sensing pads 131 and the second sensing pads 132 may be same as each other, and the first sensing pads 131 and the second sensing pads 132 may have various shapes. Taking FIG. 1A and FIG. 1B as an example, the shapes of some first sensing pads 131 and some second sensing pads 132 may be rhombuses (including squares), while the shapes of other first sensing pads 131 and other second sensing pads 132 may be triangles. Shapes of some first sensing pads 131 and some second sensing pads 132 located at an edge E1 of the touch panel 100 are triangles, while shapes of other first sensing pads 131 and other second sensing pads 132 are rhombuses.

Since the shapes of both the first sensing pads 131 and the second sensing pads 132 may be rhombuses or triangles, each of the first sensing pads 131 has more than three first line edges L1, and each of the second sensing pads 132 has more than three second line edges L2. Specifically, both the first sensing pads 131 and the second sensing pads 132 in the shape of triangles respectively have three first line edges L1 and three second line edges L2, and both the first sensing pads 131 and the second sensing pads 132 in the shape of rhombuses have four first line edges L1 and four second line edges L2, as shown in FIG. 1A and FIG. 1B.

In the first sensing pads 131 and the second sensing pads 132 in the shape of rhombuses, four second line edges L2 surround one first sensing pad 131, and four first line edges L1 surround one second sensing pad 132. Specifically, four first line edges L1 of one first sensing pad 131 correspond to second line edges L2 of four second sensing pads 132 respectively, and four second line edges L2 of one second sensing pad 132 correspond to first line edges L1 of four first sensing pads 131 respectively, so one first sensing pad 131 in the shape of a rhombus is surrounded by four adjacent second sensing pads 132, and one second sensing pad 132 in the shape of a rhombus is surrounded by four adjacent first sensing pads 131.

The reticulated electrode 160 has a plurality of openings 162, and the openings 162 are arranged in an array. The first sensing pads 131 and the second sensing pads 132 are located in the openings 162 respectively, so the first sensing pads 131 and the second sensing pads 132 are also arranged in the array. All of the first sensing pads 131 and all the second sensing pads 132 are electrically insulated from the reticulated electrode 160, and the reticulated electrode 160 may be further grounded. Therefore, when the user operates the touch panel 100, the reticulated electrode 160 basically does not receive the sensing signals output from the first sensing pads 131 and the second sensing pads 132, and a voltage of the reticulated electrode 160 is unequal to voltages of both the first sensing pads 131 and the second sensing pads 132.

The discharge electrodes 170 are connected to the reticulated electrode 160, so the discharge electrodes 170 are electrically connected to the reticulated electrode 160 and also electrically insulated from the first sensing pads 131 and the second sensing pads 132. Each of the discharge electrodes 170 is located between two adjacent first sensing pads 131 and between two adjacent second sensing pads 132. Taking FIG. 1B as an example, four adjacent discharge electrodes 170 are located in a region R1 surrounded by two adjacent first sensing pads 131 and two adjacent second sensing pads 132, and are arranged in a 2×2 array. Each of the first bridges 141 is located between two adjacent discharge electrodes 170, and each of the second bridges 142 is located between two adjacent discharge electrodes 170.

Based on a case that both the reticulated electrode 160 and the discharge electrodes 170 are electrically insulated from the first sensing pads 131 and the second sensing pads 132, when the touch panel 100 is in operation, voltages of both the reticulated electrode 160 and the discharge electrodes 170 are unequal to voltages of both the first sensing pads 131 and the second sensing pads 132, so a plurality of discharge paths for discharging electric charges within the first sensing pads 131 and the second sensing pads 132 to the reticulated electrode 160 or the discharge electrodes 170 can be generated, thereby preventing a large amount of charges from accumulating in the first sensing pads 131 and the second sensing pads 132 and reducing a chance that the first sensing pads 131, the second sensing pads 132, the first bridges 141, and the second bridges 142 are damaged by static electricity. Then, it enhances an ability of protecting the touch panel 100 from electrostatic discharge.

In addition, referring to FIG. 1A and FIG. 1B, the touch panel 100 may further include a plurality of first additional discharge electrodes 181 and a plurality of second additional discharge electrodes 182. The first additional discharge electrodes 181 and the second additional discharge electrodes 182 are all disposed on the insulating layer 120. The first additional discharge electrodes 181 are connected to the reticulated electrode 160. The second additional discharge electrodes 182 are connected to the first line edges L1 and the second line edges L2. Some second additional discharge electrodes 182 are connected to the first line edges L1, and other second additional discharge electrodes 182 are connected to the second line edges L2.

Therefore, the first additional discharge electrodes 181 are electrically connected to the reticulated electrode 160. Some second additional discharge electrodes 182 are electrically connected to the first sensing pads 131, and other second additional discharge electrodes 182 are electrically connected to the second sensing pads 132. However, because all of the first sensing pads 131 and all of the second sensing pads 132 are electrically insulated from the reticulated electrode 160, the first additional discharge electrodes 181 are also electrically insulated from the second additional discharge electrodes 182.

In the embodiment as shown in FIG. 1A and FIG. 1B, each of the first additional discharge electrodes 181 is located between a first sensing pad 131 and a second sensing pad 132 adjacent to the first sensing pad 131 and is further located between a first line edge L1 and a second line edge L2 adjacent to the first line edge L1. Where a first sensing pad 131 is adjacent to a second sensing pad 132, two adjacent second additional discharge electrodes 182 are opposite to each other, and each of the first additional discharge electrodes 181 may be further located between two adjacent second additional discharge electrodes 182, as shown in FIG. 1A and FIG. 1B.

In addition, the touch panel 100 may further include a plurality of auxiliary discharge electrodes 190. The auxiliary discharge electrodes 190 are disposed on the insulating layer 120 and are connected to the reticulated electrode 160. Therefore, the auxiliary discharge electrodes 190 are electrically connected to the reticulated electrode 160 and the first additional discharge electrodes 181, but are electrically insulated from the second additional discharge electrodes 182, the first sensing pads 131, and the second sensing pads 132.

As seen from FIG. 1A and FIG. 1B, each of the auxiliary discharge electrodes 190 is located between two adjacent first sensing pads 131, between two adjacent second sensing pads 132, between two first bridges 141, and between two second bridges 142. Taking FIG. 1B as an example, the auxiliary discharge electrodes 190 are located outside the region R1 and are located in a region R2 surrounded by two adjacent first sensing pads 131 and two adjacent second sensing pads 132, so the auxiliary discharge electrodes 190 are not near where the first bridges 141 cross the second bridges 142.

In addition, each of the auxiliary discharge electrodes 190 may be in a shape of a rhombus or a triangle. Taking FIG. 1A and FIG. 1B as an example, shapes of some auxiliary discharge electrodes 190 are rhombuses, and shapes of some other auxiliary discharge electrodes 190 are triangles. Specifically, shapes of some auxiliary discharge electrodes 190 located at the edge E1 of the touch panel 100 may be triangles, but shapes of other auxiliary discharge electrodes 190 may be rhombus.

Based on the above description, in the touch panel of the present invention, the reticulated electrode and the discharge electrodes are electrically insulated from the first sensing pads and the second sensing pads, so the reticulated electrode and the discharge electrodes can generate a plurality of discharge paths for discharging electric charges within the first sensing pads and the second sensing pads to the reticulated electrode or the discharge electrodes when the touch panel is in operation. Therefore, a chance that the first sensing pads, the second sensing pads, the first bridges, and the second bridges are damaged by the static electricity can be reduced, thereby enhancing an ability of protecting the touch panel from the electrostatic discharge and improving the product reliability.

Furthermore, the touch panel of the present invention may further include the first additional discharge electrodes connected to the first sensing pads and the second sensing pads, and the second additional discharge electrodes and the auxiliary discharge electrodes connected to the reticulated electrode. Through the first additional discharge electrodes, the second additional discharge electrodes, and the auxiliary discharge electrodes, the present invention can further increase the number of discharge paths for charges, so the chance that the first sensing pads and the second sensing pads are by damaged by the static electricity can further be reduced, thereby further enhancing an ability of protection from the electrostatic discharge of the touch panel, and greatly improving the product reliability.

Although the present invention has been disclosed through the preferred embodiments as above, the present invention is not limited thereto. Equivalent replacements of variations and modifications made by persons skilled in the art without departing from the spirit and the scope of the present invention still fall within the protection scope of the present invention.

What is claimed is:

1. A touch panel, comprising:
a substrate;
a plurality of first bridges, disposed on the substrate;
an insulating layer, disposed on the substrate and covering the first bridges;
a plurality of conductive columns, disposed in the insulating layer, wherein each of the first bridges is connected to two adjacent conductive columns;
a plurality of second bridges, disposed on the insulating layer and crossing the first bridges respectively;
a plurality of first sensing pads, disposed on the insulating layer and connected to the conductive columns, wherein each of the first bridges is located between two adjacent first sensing pads;
a plurality of second sensing pads, disposed on the insulating layer, wherein each of the second bridges is connected between two adjacent second sensing pads;
a reticulated electrode, disposed on the insulating layer and having a plurality of openings arranged in an array, wherein the first sensing pads and the second sensing pads are located in the openings respectively, and the first sensing pads and the second sensing pads are electrically insulated from the reticulated electrode; and
a plurality of discharge electrodes, disposed on the insulating layer and connected to the reticulated electrode, wherein each of the discharge electrodes is located between two adjacent first sensing pads and between two adjacent second sensing pads.

2. The touch panel according to claim 1, wherein the first bridges extend in a first direction, the second bridges extend in a second direction, and the first direction is vertical to the second direction.

3. The touch panel according to claim 1, wherein each of the first bridges is located between two adjacent discharge electrodes.

4. The touch panel according to claim 1, wherein each of the second bridges is located between two adjacent discharge electrodes.

5. The touch panel according to claim 1, wherein shapes of both some first sensing pads and some second sensing pads are rhombuses, and shapes of both some other first sensing pads and some other second sensing pads are triangles.

6. The touch panel according to claim 5, wherein each of the first sensing pads has more than three first line edges, each of the second sensing pads has more than three second line edges, four second line edges surround one of the first sensing pads, and four first line edges surround one of the second sensing pads.

7. The touch panel according to claim 6, further comprising a plurality of first additional discharge electrodes, wherein the first additional discharge electrodes are disposed on the insulating layer and connected to the reticulated electrode, and each of the first additional discharge electrodes is located between the first line edge and the second line edge adjacent to first line edge.

8. The touch panel according to claim 7, further comprising a plurality of second additional discharge electrodes, wherein the second additional discharge electrodes are disposed on the insulating layer and connected to the first line edges and the second line edges, and each of the first additional discharge electrodes is further located between two adjacent second additional discharge electrodes.

9. The touch panel according to claim 1, further comprising a plurality of auxiliary discharge electrodes, wherein the auxiliary discharge electrodes are disposed on the insulating layer and connected to the reticulated electrode, each of the auxiliary discharge electrodes is located between two adjacent first sensing pads, between two adjacent second sensing pads, between two first bridges, and between two second bridges.

10. The touch panel according to claim 9, wherein shapes of the some auxiliary discharge electrodes are rhombuses, and shapes of the other auxiliary discharge electrodes are triangles.

* * * * *